(12) United States Patent
Bakker

(10) Patent No.: US 11,368,029 B2
(45) Date of Patent: Jun. 21, 2022

(54) PORTABLE POWER SUPPLY

(71) Applicant: KOKI HOLDINGS CO., LTD., Tokyo (JP)

(72) Inventor: Rients Bakker, York (GB)

(73) Assignee: KOKI HOLDINGS CO., LTD., Tokyo (JP)

( * ) Notice: Subject to any disclaimer, the term of this patent is extended or adjusted under 35 U.S.C. 154(b) by 125 days.

(21) Appl. No.: 15/486,112

(22) Filed: Apr. 12, 2017

(65) Prior Publication Data

US 2017/0222454 A1 Aug. 3, 2017

Related U.S. Application Data

(63) Continuation-in-part of application No. 15/122,766, filed as application No. PCT/GB2015/050651 on Mar. 6, 2015, now Pat. No. 10,946,508.

(30) Foreign Application Priority Data

Mar. 6, 2014 (GB) ..................................... 1403971

(51) Int. Cl.
*H01M 50/247* (2021.01)
*H02J 7/00* (2006.01)
(Continued)

(52) U.S. Cl.
CPC .............. *H02J 7/0013* (2013.01); *B25F 5/00* (2013.01); *H01M 10/441* (2013.01);
(Continued)

(58) Field of Classification Search
None
See application file for complete search history.

(56) References Cited

U.S. PATENT DOCUMENTS

| 3,694,729 A | 9/1972 | Jones |
| 3,718,848 A * | 2/1973 | Hines .................... H02J 7/0024 320/117 |

(Continued)

FOREIGN PATENT DOCUMENTS

| EP | 2397277 A1 | 12/2011 |
| EP | 2559521 A1 | 2/2013 |

(Continued)

OTHER PUBLICATIONS

International Searching Authority, PCT/GB2015/050651, "The International Search Report and the Written Opinion", 11 pages, dated Sep. 15, 2016.

(Continued)

*Primary Examiner* — Lucas J. O'Donnell
(74) *Attorney, Agent, or Firm* — McDermott Will & Emery LLP

(57) ABSTRACT

There is provided a battery power pack and power tool system, including at least first and second power tools operational with a first voltage supply level and a second power voltage supply level respectively. The battery pack is selectively mechanically and electrically connectable with each of the said power tools to provide power thereto and the first power tool includes electrical connection means in a first configuration to provide the power from the battery pack for the operation of said first power tool at the said first voltage supply level and the second power tool includes electrical connection means in a second configuration to provide the power from the battery pack for the operation of said second power tool at the said second voltage supply level such that the same battery pack is used to supply different required voltage supply levels for the respective power tools.

19 Claims, 16 Drawing Sheets

(51) Int. Cl.
  *H01M 10/46* (2006.01)
  *B25F 5/00* (2006.01)
  *H01M 10/44* (2006.01)
  *H01M 50/213* (2021.01)

(52) U.S. Cl.
  CPC ......... *H01M 10/46* (2013.01); *H01M 50/213* (2021.01); *H02J 7/0044* (2013.01); *H01M 2220/30* (2013.01)

(56) References Cited

U.S. PATENT DOCUMENTS

| | | | | |
|---|---|---|---|---|
| 5,506,456 | A * | 4/1996 | Yang | G05F 1/59 307/81 |
| 2005/0193538 | A1 | 9/2005 | Quinn et al. | |
| 2006/0091858 | A1 | 5/2006 | Johnson et al. | |
| 2011/0250484 | A1 | 10/2011 | Meng | |
| 2016/0020443 | A1 * | 1/2016 | White | H02J 7/0024 318/245 |
| 2017/0222454 | A1 | 8/2017 | Bakker | |

FOREIGN PATENT DOCUMENTS

| | | | |
|---|---|---|---|
| JP | 09-283109 A | 10/1997 | |
| JP | 2011-015538 A | 1/2011 | |
| JP | 2012066333 A * | 4/2012 | ............ B23B 45/02 |

OTHER PUBLICATIONS

U.S. PTO Non-Final Office Action issued in related parent U.S. Appl. No. 15/122,766, dated Nov. 7, 2019.
U.S. PTO Final Office Action issued in related parent U.S. Appl. No. 15/122,766, dated Apr. 24, 2019.
U S. PTO Non-Final Office Action issued in related parent U.S. Appl. No. 15/122,766, dated Jul. 12, 2018.
Parent U.S. Appl. No. 15/122,766, filed Aug. 31, 2016.
U.S. PTO Non-Final Office Action issued in related U.S. Appl. No. 15/122,766, dated Jun. 29, 2020.
U.S. PTO Non-Final Office Action issued in related U.S. Appl. No. 16/698,662, dated Sep. 16, 2020.
U.S. PTO Non-Final Office Action issued in related U.S. Appl. No. 16/698,689, dated Sep. 16, 2020.

* cited by examiner

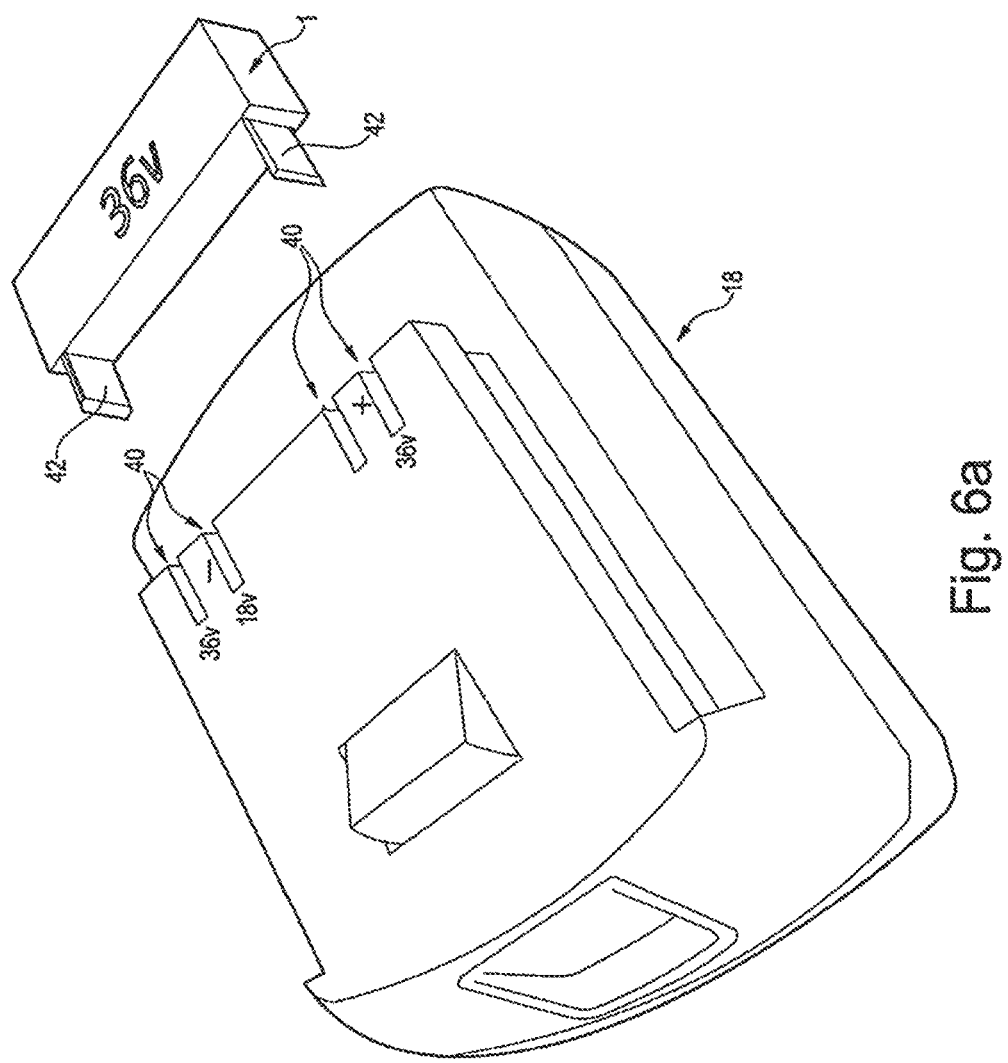

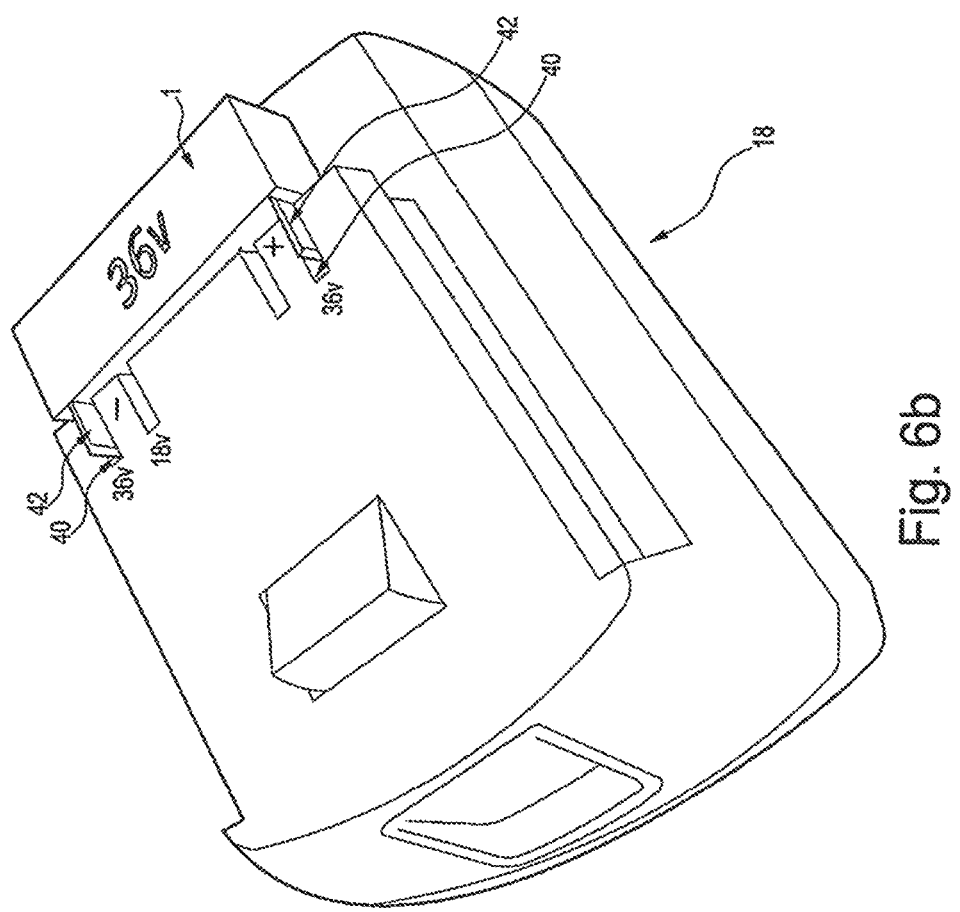

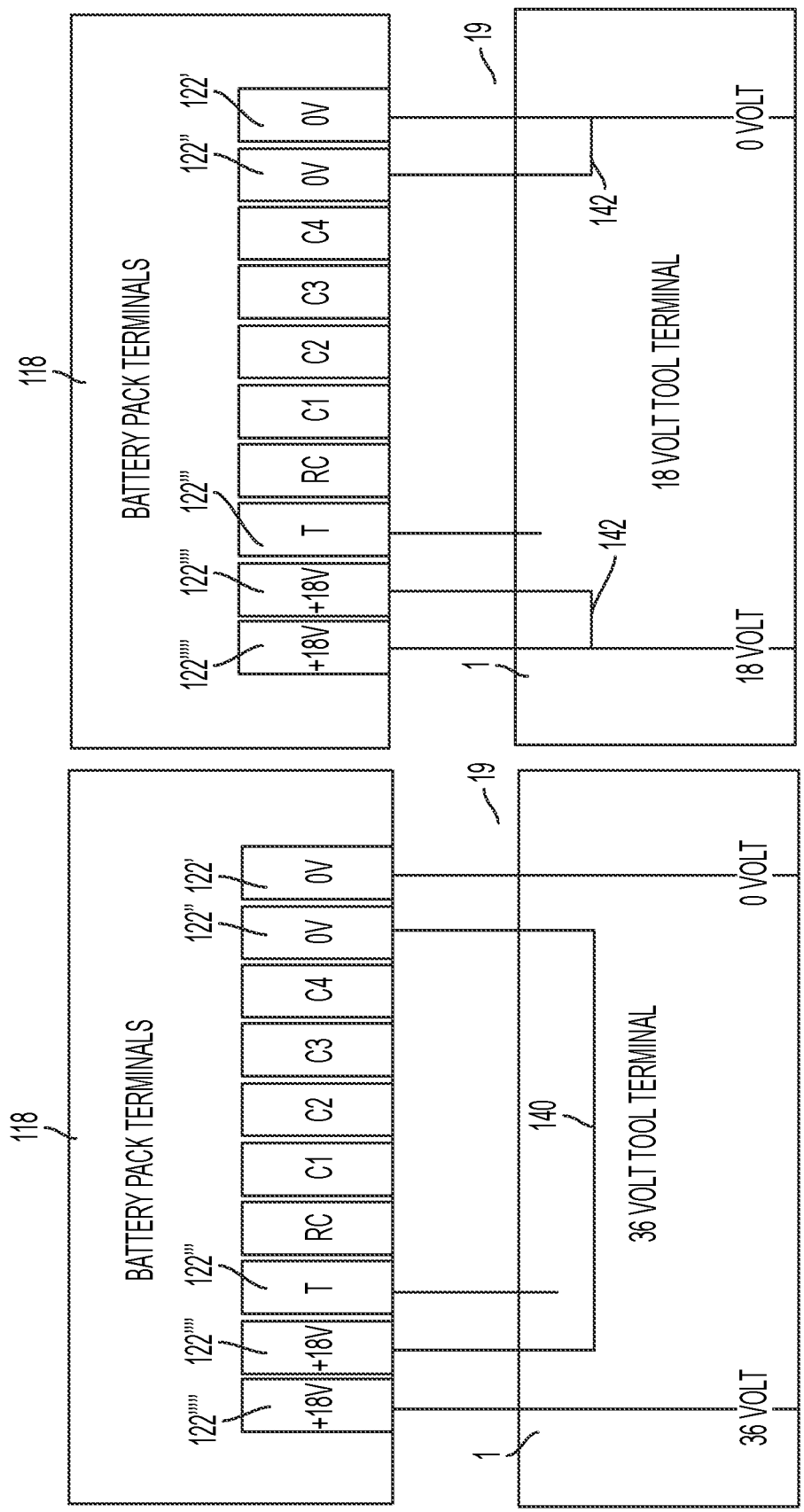

| RC | C1 | C2 | C3 | C4 | Remark: |
|---|---|---|---|---|---|
| 0 | $V_{Cell1}$ | $V_{Cell2}$ | $V_{Cell3}$ | $V_{Cell4}$ | Combination RC = 0 and $V_{Cell1}$ Indicates Series 1 |
| 1 | $V_{Cell10}$ | $V_{Cell9}$ | $V_{Cell8}$ | $V_{Cell7}$ | Combination RC = 0 and $V_{Cell10}$ Indicates Series 2 |

Figure 11b

PORTABLE POWER SUPPLY

CROSS REFERENCE TO RELATED APPLICATIONS

This is a continuation-in-part application of copending, commonly assigned U.S. application Ser. No. 15/122,766, filed Aug. 31, 2016, entitled "Portable Power Supply," which is a 371 of international application PCT/GB2015/050651, filed Mar. 6, 2015, which claims priority to British Application No. 1403971.3, filed Mar. 6, 2014, all of which are herein incorporated by reference in their entirety.

FIELD OF THE INVENTION

The invention to which the application relates is a portable power supply, typically of a form referred to as a battery pack, which can be detachably attached to a powered item such as a power tool in order to allow the power tool to be rendered operable when the battery pack is at least partially charged.

BACKGROUND OF THE INVENTION

The provision of battery packs which can be attached to a power tool to allow power to be supplied to operate the tool is well known. Conventionally, for tools such as drills, reciprocating saws and the like two versions of particular models will be provided, a first version with a mains power supply connection and a second version in which the power is supplied from the connected battery pack and which therefore allows the tool to be used at locations where a mains power supply is not readily connectable.

The battery pack typically comprises a plurality of cells which are interconnected so as to provide power therefrom. The cells are provided within, typically, a sealed housing, and the housing is provided with location means to allow the battery pack to be located and electrically connected with the power tool to provide power thereto and also provided with location means to allow the battery pack to be electrically connected to a charger device to allow the recharging of the batteries in the battery pack.

For the battery pack to be usable, the same needs to be periodically charged and the frequency at which the charge needs to be made can be dependent upon a number of factors, alone or in combination, and which can include, the level and load of the usage of the power tool, the capacity of the battery pack, the age of the battery pack and/or the form of the cells provided therein. The type, speed and power of power tools which can be operated in conjunction with a battery pack can also be limited by the above factors. It is therefore found that while the use of battery packs has undoubted advantages in allowing the greater flexibility of location of usage of the same, the user of the power tool can become frustrated by the lack of full power of the power tool when operated and/or the lack of time between the need to recharge the battery pack.

In addition to the above, the conventional battery packs provided for use with power tools are typically configured to provide a power supply at a specific voltage, most typically 18 Volts. The conventional 18 Volt battery packs are typically provided in two forms, with a housing in which 5 power cells or batteries are provided or with a housing in which 10 power cells or batteries are provided. An advantage of the 5-cell battery pack is that the same is more compact and lighter than the 10-cell pack and therefore does not add significant weight to the power tool when the same is connected thereto. An advantage of using the 10-cell pack is that it can have a longer discharge power time and higher current draw capability than the 5-cell pack.

The means of connection with the power tools and/or battery pack can typically be selected to suit specific power tool and/or charger requirements and it is commonly the case that a battery pack is provided for use with a number of tools which are common to one manufacturer but cannot be used on power tools which are common to another manufacturer. However, in each case, typically the connections will include an 18V and 0V connecting terminal, each of which is provided in the form of a female socket provided in one of the battery pack or power tool and a male plug provided in the other of the battery pack or power tool. In addition to the cells, the battery pack and/or the power tool may include power supply control means which allow the controlled charging of the cells and the discharge of power from the same to the power tool.

However, a problem with the conventional battery packs is that they are currently designed to supply a fixed voltage, such as 18V, as the convention is that the manufacturers of the same and the power tools have an obligation to support the users of their tools which are already in the marketplace and which are already operating using 18V power packs. This therefore creates an inertia in terms of developing battery packs which can provide a different voltage as these would then not be usable on the existing power tools. This is the case even though different tools to which the battery pack can be attached require different power wattage values in order to operate safely and most efficiently. This means that when controlling the operation of the battery pack to supply power to a range of tools with different power or "current draw" requirements, such as, for example, a chainsaw and a torch, which have significantly different operating power requirements, considerable design and control hardware and software components are required to be provided to control the power supplied in a manner which is sufficient to allow operation of the power tool in a safe manner. It also means that for power tools which require relatively high power supply thereto, such as a motor for the chainsaw, the current which is produced has to be relatively high in order to achieve the required power Wattage, with 300 W currently being the typical upper limit which can be provided whilst maintaining control of operation of the power tool motor. As the voltage is for example rated at 18 Volts it is only possible to increase the current in order to increase the power. However to increase the power from 300 W to 450 W requires a current increase of 50% and the current draw increase relates directly to the component cost increase. In addition, this provides significant additional expense to the conventional battery pack which is provided with a fixed voltage output. Furthermore, if the control means of the battery pack malfunction then there is a risk of damage being caused to the power tool to which the battery pack is connected. There can also be concern over the ability to control the operation of the motor of the power tool when the efficient operation of the motor is exceeded. In addition, higher current draw will significantly reduce the life of the battery.

Attempts to provide battery packs which provide a higher, fixed voltage, have, to date, been in the form of large and bulky packs due to the relatively large number of cells required to be accommodated therein in order to provide the higher Voltage, and which therefore adds significant weight to the power tool or another option has been to use two lower fixed voltage battery packs in combination which provides the additional weight problem and also raises problems in terms of accommodating the two packs on the body of the power tool as well as the need to charge two battery packs simultaneously.

US20130002175 discloses a battery pack system in which there are provided different types of battery packs and attachment means and control means are provided in order to allow a wider range of battery packs to be used safely on the same tool. The disclosure also prevents battery packs which would not be safe to use with a particular power tool from being used.

It is also known from the patent application US2016204475 to provide a system whereby a battery pack can be adapted to provide two different voltages therefrom, with the adaptation typically being as a result of a mechanical intervention when one of two different power tools are connected to the battery pack so that one of the power tools mechanically joins with the battery pack to cause the battery pack to operate in a default format at which a first voltage passes from the battery pack to the power tool and the other of the power tools mechanically adapts the battery pack to operate electrically in a different format at which a different voltage level passes from the battery pack to the power tool and which voltage is more suitable for that power tool than the voltage provided when the battery pack is in the default form. Another known system allows a switch mechanism to be provided on the battery pack which allows the battery pack to be switched by the user to operate between two voltages. The disadvantage of both of these known systems is that the power tool is required to be provided with a specific mechanical and electrical configuration and the battery pack which is common to both power tools is also required to be provided with a relatively complex mechanical and electrical connection systems in order for the battery pack to be adapted to the two different configurations.

This means that what would previously have been a relative simple battery pack component is now significantly more complex and hence more expensive and that in order for power tools which are connected thereto to be provided with the appropriate voltage additional safety features have to be incorporated into the battery pack in order to allow the battery pack to operate safely at both voltage levels and also for the battery pack to be safe when not in use and also when in transit.

Furthermore, the mechanical adaptation of the battery pack to allow it to operate at the required voltage can be difficult to achieve repeatedly especially when one considers that the battery pack and power tools are often used in environments in which there is considerable dust, wood chips and/or in external environments in which debris, soil, mud and the like may be present, all of which can clog up and potentially prevent the mechanical adaptation occurring and hence prevent the change in voltage being achievable.

SUMMARY OF THE INVENTION

The aim of the present invention is to provide a battery power pack which can be used in conjunction with power tools and which can be used to provide more than one voltage supply. A further aim is to provide a battery power pack which has increased flexibility and which allows the voltage which can be provided from the same to be selectable and thereby be better suited to the operation of the particular power tool to which the battery pack is fitted at that time.

In a first aspect of the invention, there is provided a battery power pack and power tool system, said system including at least first and second power tools, the first power tool operational with a first voltage supply level and the second power tool operational with a second voltage supply level, said battery pack selectively mechanically and electrically connectable with each of the said power tools to provide power thereto and wherein the first power tool includes electrical connection means in a first configuration to provide the power from the battery pack for the operation of said first power tool at the said first voltage supply level and the second power tool includes electrical connection means in a second configuration to provide the power from the battery pack for the operation of said second power tool at the said second voltage supply level such that the same battery pack is used to supply different required voltage supply levels for the respective power tools.

It is, therefore, the case that the power tool which is connected to the battery pack determines, as a result of the configuration of the electrical connection means provided therein, the voltage level which is used for its operation.

Typically, the configuration of the battery pack remains constant regardless of the power tool connected thereto.

In one embodiment, the battery pack includes a plurality of power cells and control means for the provision of power from the battery pack to the power tool which is connected to the same at that time.

In one embodiment, the battery pack is common for use for power tools in the system and remains in the same electrical connection form regardless of which of the first and second power tools is connected thereto. Typically, the rated voltage of the battery pack is the same throughout and typically the rated voltage is the smaller of the different voltages required by the power tools.

In one embodiment, the at least two voltages which can be selectively provided are a first voltage "n"V and a second voltage "2n"V. In one embodiment n has a value in the range of 16-22V.

In one embodiment, the two voltages which can be selectively provided are 18V and 36V. It should be noted that further voltage levels may also be obtained from the battery pack.

In one embodiment, the voltage supply at the interface between the mechanical and electrical interface between the battery pack and the power tool connected thereto is the same when either of the first or second power tools is connected thereto.

Typically, the particular voltage supply which is generated for operation of the power tool is selected and defined by the particular configuration of the electrical connection means within the power tool.

Typically, therefore, the selection of the particular voltage level provided for operation of the power tool is selected by and within the power tool.

Typically, therefore, the selection is made by electrical interaction within the power tool which determines the voltage supply which is required to operate the particular power tool once the battery pack has been connected thereto.

In one embodiment, mechanical safety means, such as a "coded" fitting, can be provided to ensure that an incorrect power pack cannot be fitted to a power tool to provide power thereto.

In one embodiment, the cells provided within the battery pack remain in the same location in the battery pack regardless of which voltage is provided and no access to the interior of the housing or to the power cells is required to change the voltage. Typically, the connection configuration between the power cells and the connection means terminals of the battery pack from which power is supplied to the power tool is selected in response to the form of the connection of the connection means at that time to thereby select the particular voltage which is to be provided to the power tool.

Typically, the connection configuration is configured within the power tool with respect to the particular voltage which is to be provided to the power tool.

In one embodiment, a first connection configuration provides the power cells of the battery pack in series connection and in a second connection configuration provides the power cells of the battery pack in parallel connection. Typically, when the power cells are provided in the first, series, configuration power is supplied at the higher of the two voltages to the power tool from the battery pack.

In one embodiment, a first configuration of the electrical connection means utilises power from groups of cells of the battery pack in a series connection and in a second configuration of the electrical connection means provides the groups of power cells of the battery pack in parallel connection. Typically, when the power cells are provided in the first, series, configuration the higher of the two voltages is supplied to the power tool from the battery pack.

In one embodiment, the battery pack is connectable to a charging device and the configuration of the cells in the battery pack is selected to be in a predefined charging configuration. Typically, the battery pack is charged at one of the voltage level values of the power tools provided to be connected to the battery pack. In one embodiment, the battery pack is charged at the higher of the at least two voltage values.

In a further aspect of the invention, there is provided a power tool, said power tool including at least one working function operated by the provision of electrical power thereto, said power can be provided by the connection of a battery pack to the power tool to allow a plurality of terminals to be connected and wherein the voltage supplied from the battery pack to the power tool is determined by the configuration of the electrical connection means provided on the power tool.

In one embodiment, the electrical connection means are supplied with power as a result of mechanical and electrical interaction between the battery pack and the power tool.

Thus, the control means for selection of the particular voltage in order to provide the required or selected voltage for the particular power tool are provided wholly on the power tool.

In a further aspect of the invention there is provided a battery power pack and power tool system, said system including at least first and second power tools, the first power tool operational with a first voltage supply level and the second power tool operational with a second voltage supply level, said battery pack selectively mechanically and electrically connectable with each of the said power tools to provide power thereto and wherein the power tool which is connected to the battery pack at a particular time determines, as a result of the configuration of the electrical connection means provided in the said power tool, the voltage level of the power supply which is used for its operation.

In a further aspect of the invention there is provided a power tool, said power tool including at least one working function operated by the provision of electrical power thereto, said power provided by the connection of a battery pack to the power tool to allow the plurality of terminals to be connected and wherein the voltage supplied from the battery pack to the power tool is determined by the configuration of the electrical connection means provided in the power tool.

Typically, the selection is made by and with respect to the configuration of electrical connection means provided within the power tool.

In a yet further aspect of the invention there is provided a battery pack including a housing, mechanical location means to allow selective engagement of a power tool therewith, a plurality of power cells located within the housing and said power cells connected in groups to provide electrical power via a set of terminals located so as to be accessible externally of the battery pack wherein said terminals include a ground terminal for each of the groups of power cells a voltage terminal greater than 0V for each of the groups of power cells and a temperature monitoring terminal.

In one embodiment, there are provided two groups of power cells so that there are provided two ground terminals and two voltage terminals.

In one embodiment, the set of terminals include a relay control signal terminal and four voltage measurement terminals.

In one embodiment, each of the power tools to be selectively connected to the battery pack include terminals to connect with each of the ground terminals, each of the voltage terminals and the temperature terminal.

In one embodiment, the battery pack charger includes terminals to connect to each of the ground terminals, each of the voltage terminals, the temperature terminal, the metering control signal terminal and four voltage measurement terminals of the battery pack.

In one embodiment, the metering control signal is provided by a relay.

By providing the battery pack and power tools in the form herein described, so one of at least two voltages which is most appropriate for the power tool to which the battery pack is connected at that time, can be provided by the battery pack to the power tool. This therefore means that the control means required to control the operation of the battery pack is significantly reduced as the demands for power or draw of a particular power tool can more efficiently and safely be provided by the provision of the appropriate voltage supply and hence the demands on control of the current provided are reduced. This, in turn, means that the hardware which is conventionally required to be provided in the battery pack as part of the control means can be removed and still allow the battery pack to operate safely and with a reduced cost of manufacture of the same. Thus, the power output from the battery pack can be selectively higher with reduced loss and reduced heat generation.

The provision of the electrical connection means in the power tools to allow the selective provision of one of at least two possible voltages to that power tool from the same battery pack as used by another power tool requiring a different voltage, also allows greater power flexibility to be provided from the same common battery pack without adversely affecting the weight or location requirements of the battery pack.

Significantly, the current requirement for both operation of the power tool and the charging of the battery pack is reduced as typically the battery pack will be charged with the cells connected in series. As power is current times voltage, the power provided can be at least maintained but the costs for doing so will be lower as the lower current is required.

It can also allow the range of power tools which can be operated by the attachment to a battery pack to be increased such as, for example, the operation of bench power tools by power supplied by a battery pack in accordance with the invention connected thereto.

In a yet further aspect of the invention, there is provided a battery power pack and power tool system, said system including at least first and second power tools and the battery pack is used to provide a power supply at a first voltage level to the first power tool and a power supply at a second voltage level, different to the first voltage level to the second power tool, said battery pack selectively mechanically and electrically connectable with each of the said power tools to provide power thereto and wherein the first power tool includes electrical connection means in a first configuration to connect to the battery pack and the second power tool includes electrical connection means in a second configuration to connect to the battery pack and the same mechanical connection configuration is used between the respective power tools and the battery pack and no user intervention is required to select the particular voltage level supplied to the respective power tools.

In one embodiment, the addition or removal of power cells to or from the battery pack is not required in order to allow the alteration of the Voltage supplied.

Preferably, the voltage which is supplied is selected via interaction between the power tool and the battery pack.

In one embodiment, the interaction is mechanical interaction between the battery pack and the power tool such that the particular electrical terminal connection means configuration causes the supply of the first or second voltages from the battery pack. In another embodiment, the interaction is electrical interaction as well as, or instead of, the connection means interaction. In this embodiment, the electrical interaction used can be the determination of the voltage supply which is required to operate the particular power tool once the battery pack has been connected thereto.

Typically, the connection means include safety means to prevent the supply of the incorrect voltage to the power tool to which the battery pack is connected at that time.

In one embodiment, the battery pack is connectable to a charging device and the configuration of the cells in the battery pack is selected to be in a predefined charging configuration. Typically, the battery pack is charged at the higher of the at least two voltages which can be supplied from the battery pack.

In one embodiment, the power tool includes a plurality of connection means electrical terminals provided on the power tool to be connected to connection means electrical terminals on the battery pack and wherein the battery pack includes a greater number of electrical terminals than the power tool and the voltage supplied from the battery pack to the power tool is determined by the location of the said power tool electrical terminals with respect to the battery pack terminals when connected therewith.

Typically, two power tool electrical terminals are provided and located such that it is only possible for the same to be connected to two of the plurality of electrical terminals provided on the battery pack and hence allow the correct voltage to be provided to the power tool.

Typically, engagement means are provided to allow the battery pack and power assembly to be engaged together in use to form an integral assembly. Typically release means are provided to allow the release of the engagement mans and the battery pack to be separated from the power tool.

In a further aspect of the invention, there is provided a battery pack for connection with a power tool to provide power for the operation of the power tool when connected thereto, said battery pack including a plurality of power cells, said power cells connectable in a first connection configuration to provide a first voltage output and in a second connection configuration to provide a second voltage output. In a yet further aspect of the invention there is provided a power tool to which power is provided from a battery pack for operation and said power tool includes connection means to allow electrical connection with the battery pack to allow power to pass from the battery pack to the power tool and wherein the location of the connection means is such that, when connected to the power tool, a particular voltage, from a range of voltages at which power can be supplied from the battery pack, is selected.

The provision of the connection means to allow the selective provision of one of at least two possible voltages also allows greater power flexibility to be provided from the battery pack without adversely affecting the weight or location requirements of the battery pack.

Typically, the battery pack is capable of providing power at two different voltage levels and the particular voltage level which is supplied is dependent upon the connection means condition and, in turn the connection configuration between the power cells of the battery pack and the connection terminals on the battery pack.

Significantly, the current requirement for both operation of the power tool and the charging of the battery pack is reduced as typically the battery pack will be charged with the cells connected configuration in series. As power equals current×voltage, the power provided can be at least maintained but the costs for doing so will be lower as the lower current is required.

The invention as herein defined allows the range of power tools which can be operated by the attachment to the battery pack in accordance with the invention to be increased such as, for example, the operation of bench power tools by power supplied by a battery pack in accordance with the invention connected thereto.

By providing the battery pack and power tool in the form herein described so one of at least two voltages which is most appropriate for the power tool to which the battery pack is connected at that time, can be provided by the battery pack to the power tool. This therefore means that the control means required to control the operation of the battery pack is significantly reduced as the demands for power or draw of a particular power tool can more efficiently and safely be provided by the provision of the appropriate voltage supply and hence the demands on control of the current provided are reduced. This, in turn, means that the hardware which is conventionally required to be provided in the battery pack as part of the control means can be reduced or indeed removed and still allow the battery pack to operate safely and with a reduced cost of manufacture of the same. Thus, the power output from the battery pack is higher with reduced loss and reduced heat generation.

BRIEF DESCRIPTION OF THE DRAWINGS

Specific embodiments of the invention are now described with reference to the accompanying drawings; wherein

FIGS. 6a and b illustrate the parts of FIGS. 5a and b in connection

FIG. 9a illustrates the battery pack and a first power tool interface connection and terminal functions in accordance with the embodiment of FIG. 8;

FIG. 9b illustrates the battery pack and a second power tool interface connection and terminal functions in accordance with the embodiment of FIG. 8;

DETAILED DESCRIPTION OF THE DRAWINGS

Figure 1:
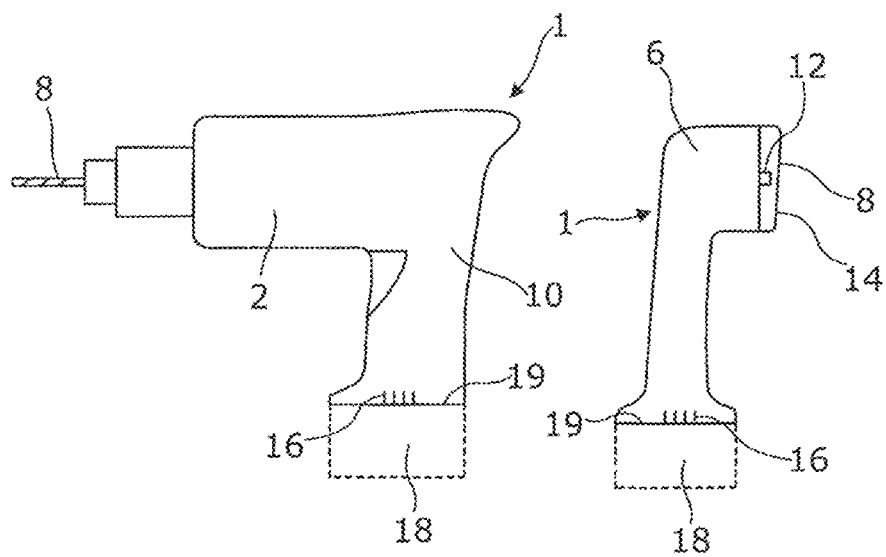
FIG. 1 illustrates examples of a range of power tools with which a battery pack in accordance with the invention may be used to provide power.

Referring firstly to FIG. 1, there is illustrated a range of power tools 1 as examples of the type of power tool with which a portable battery pack in accordance with the invention can be utilised. The examples given are of a drill 2, chainsaw 4, torch 6. In each case the power tool has a working portion 8 which is provided with power to operate. In the case of the chainsaw and the drill the same are provided with a motor within the housing 10 which causes the movement of the working portion 8 and in the torchlight a bulb 12 is provided to allow light to be emitted from the face 14 of the torchlight. In each case, the body is provided with electrical connection means, typically in the form of pins 16, which are positioned so as to be received in matching slots provided in the battery pack 18 which can be mechanically located with the housing, as shown in broken lines at an interface 19 between the power tool and the battery pack. When electrical connection has been made, typically automatically upon the correct mechanical location of the battery pack with the housing, power is supplied from the battery pack to the power tool to allow the same to be used. The battery pack and power tool are provided with engagement means which allow the battery pack to be engaged with the power tool and form an integral part thereof when the power tool is in use and power is being supplied thereto. Release means are provided which allow disengagement of the battery pack from the tool, most typically to allow the battery pack to be charged separately from the power tool.

Figure 2:
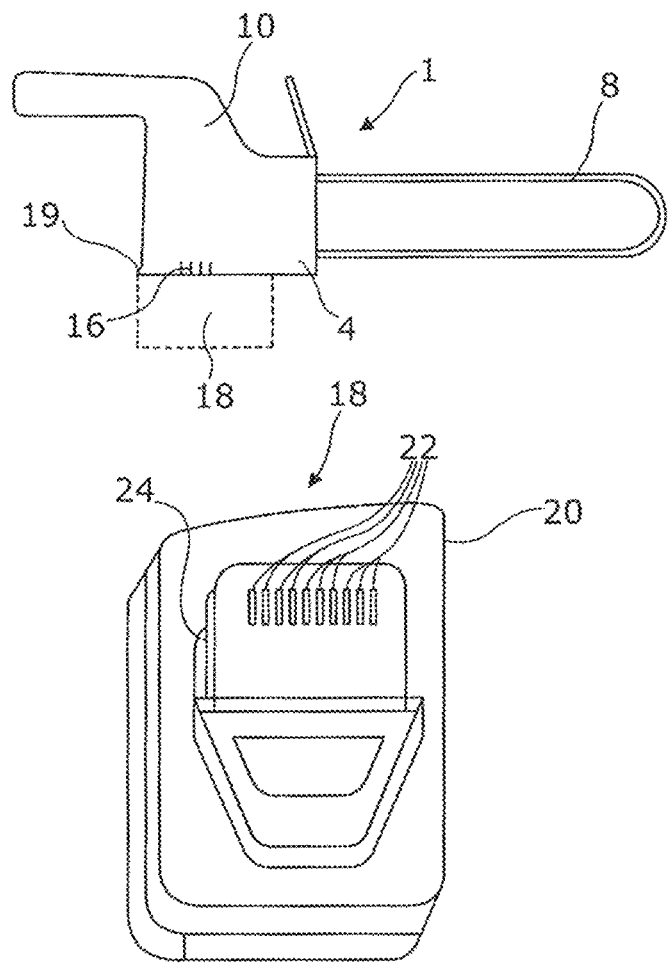
FIG. 2 illustrates one embodiment of a battery pack of a form in accordance with the current invention.

FIG. 2 illustrates in more detail an example of a battery pack 18 in accordance with one embodiment and the same comprises a housing 20 within which a series of batteries or cells are located in a fixed and interconnected position. During use of the battery pack 18 no access is required to be made to the power cells and the periodic charging of the cells can be achieved via connection with a battery charger, most typically using the same connection means electrical terminal slots 22 and mechanical connection means 24 which allow connection with the matching connection means of the power tool. The engagement means are provided to allow the battery pack 18 to be located and locked on the power tool.

Figure 3:
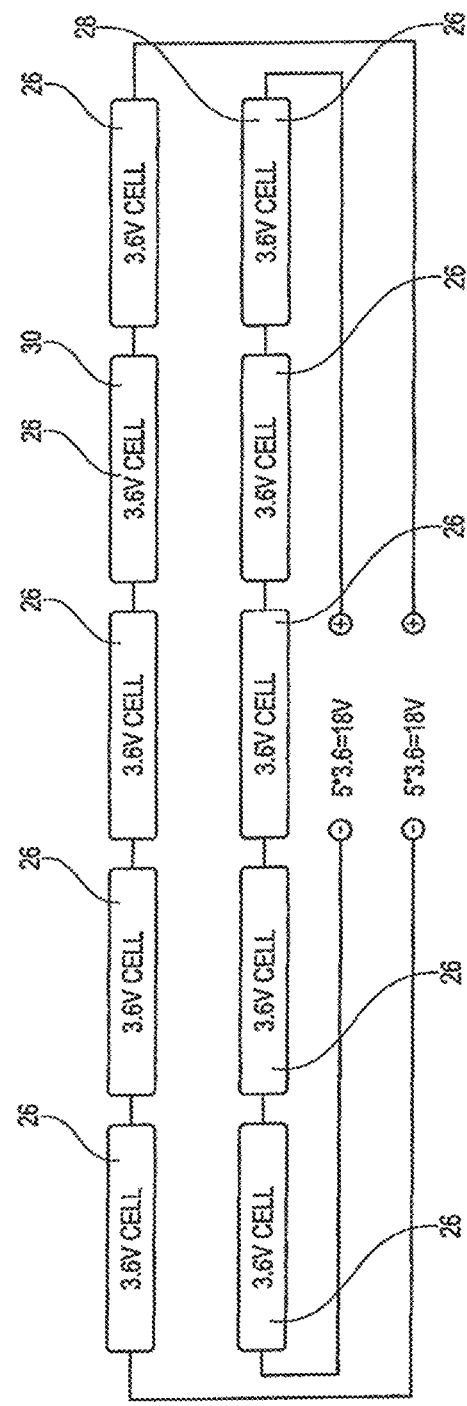
FIG. 3 illustrates the layout of the battery pack cells for use in accordance with one embodiment of the invention.

FIG. 3 illustrates the layout of a series of batteries or power cells 26 within a battery pack in accordance with the invention and it will be seen that two "banks" or "groups" 28, 30 of the cells are provided. The cells 26 in each group are interconnected in series and are provided with connections which can provide 18V which lead to connection terminals which are described in more detail with regard to FIGS. 4a and b. Typically each of the cells are of the same voltage.

Figure 4A:
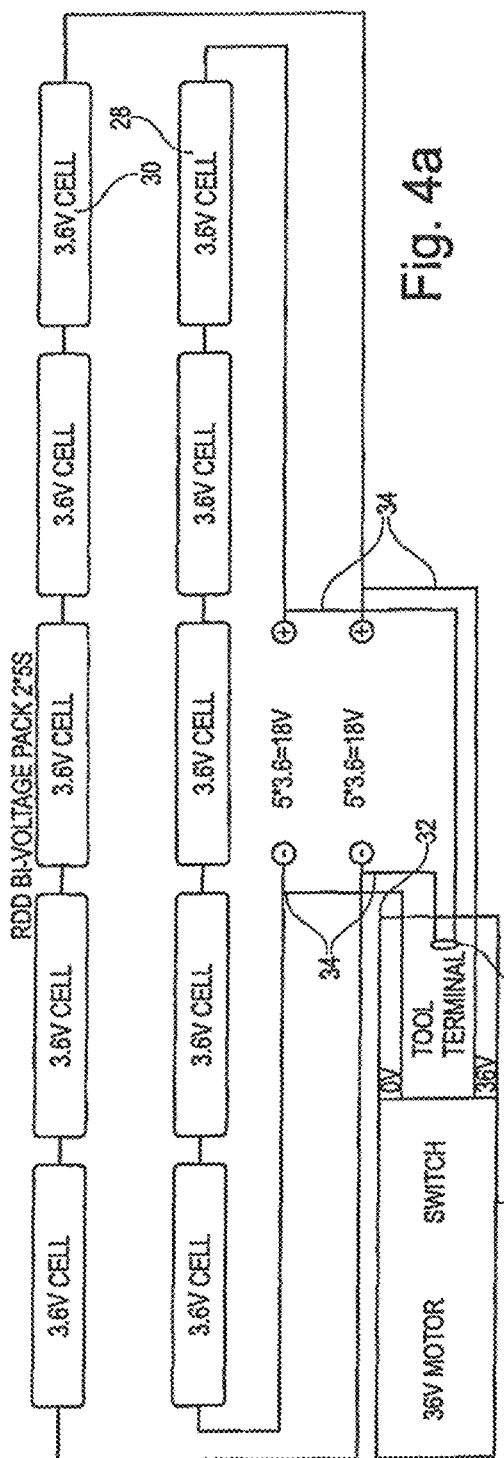
FIGS. 4a and b illustrate first and second connection configurations of the power cells of the battery pack of FIG. 3 in accordance with the invention.
Figure 4B:
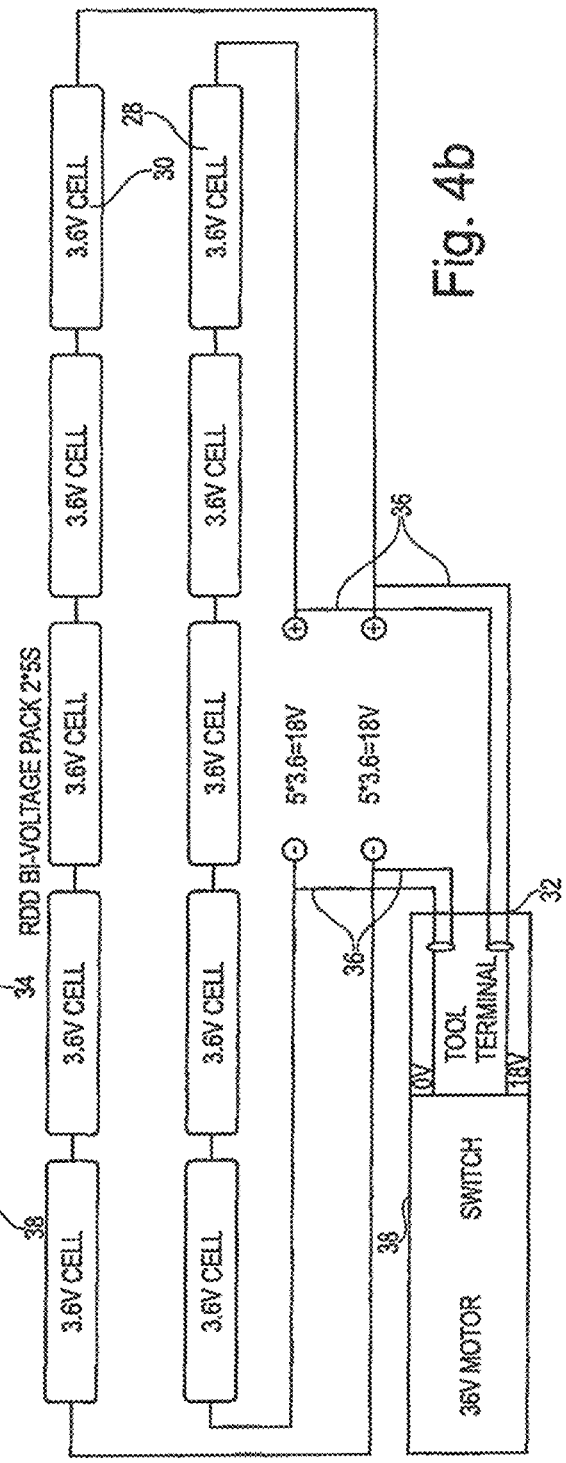

In accordance with the invention, the connection configuration between the groups of cells 28,30 and the connection terminals at interface 32 with the power tool 1 can be provided in at least two configurations. A first configuration 34 is shown in FIG. 4a in which the groups of cells 28, 30 are provided in series at the connections to the connection means electrical terminals and in FIG. 4b the groups of cells 28,30 are provided in a parallel configuration 36 at the connection means electrical terminals. In the first configuration, the cells provide 36 Volts to the power tool and in the second configuration the battery pack delivers 18V to the power tool, from the same cells provided in the battery pack. This, therefore, allows the battery pack to be range taking inasmuch that the same battery pack can be used to provide power at different voltages to the power tool and also means that higher power can be provided to those tools that require the same without having to unduly increase the current capability.

Typically, the selection of the particular configuration and hence the voltage which is delivered from the power pack is as a result of mechanical connection in which case the power tool is provided with connection means to control the operation of the connection means to the configuration 34 or 36 provided on the battery pack when the battery pack is being connected to or is connected with the power tool.

Figure 5A:
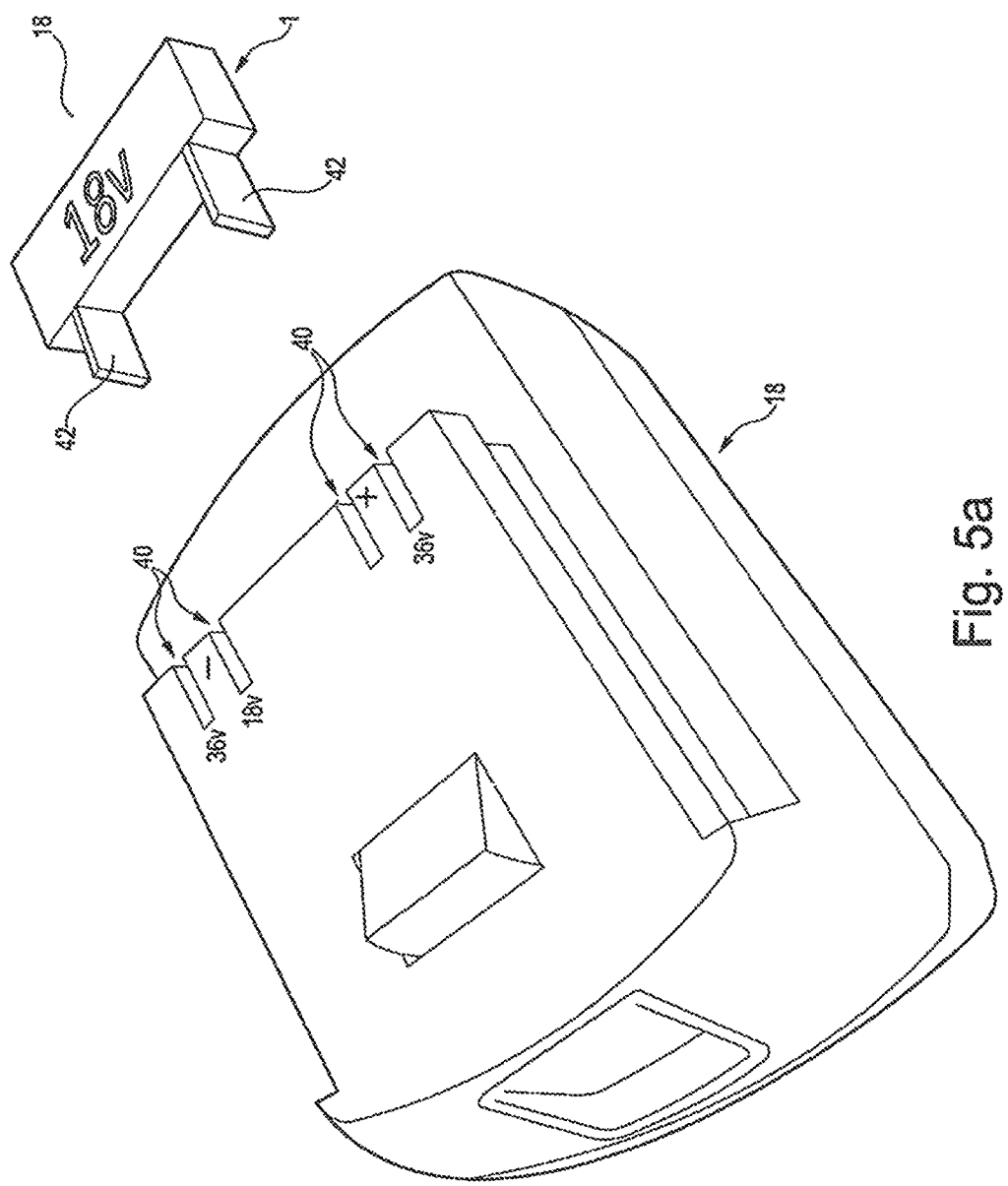
FIGS. 5a and b illustrate the connection means of the power tool in different configurations separate from the battery pack in accordance with an embodiment of the invention.

FIGS. 5a-b and 6a-b illustrate an embodiment of this form in which the FIGS. 5a and b illustrate the power tool 1 separate from the battery pack 18 and FIGS. 6a and b illustrate the battery pack 18 and power tool 1 in connection so that power can be supplied thereto. In this embodiment the selection of the voltage of the power supply is made by providing the battery pack with a number of connection means female electrical terminals 40 with a first pair of the terminals allowing connection to the power cells in a first connection configuration for an 18 Volt power supply and the second pair of the electrical terminal allowing connection to the power cells in a second connection configuration for the 36 Volt power supply, i.e the selective connection to one of the power cell configurations of FIG. 4a or b.

Figure 5B:
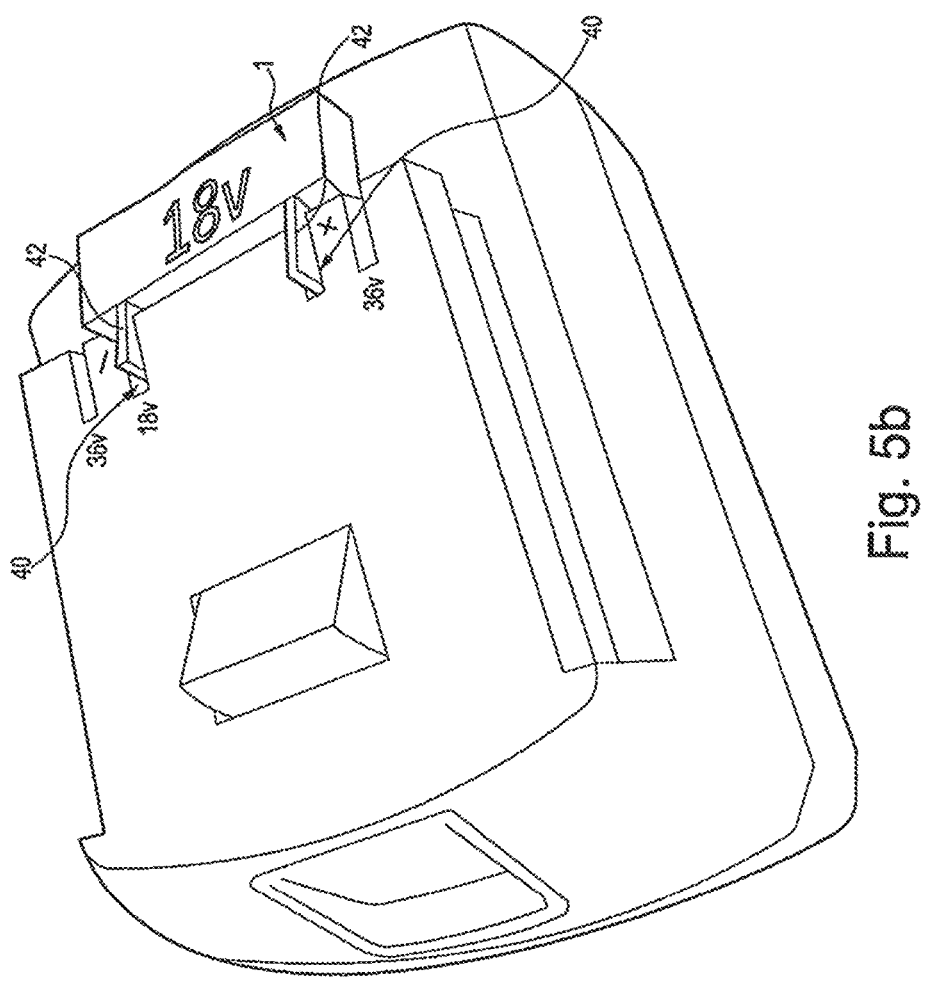

The power tool is provided with two male electrical terminal plug connection means 42. In FIGS. 5a and 6a the plug connection means are located and spaced apart so as to be received in the inwardly positioned pair of female electrical terminals 40 which will allow connection to the 18 Volt power supply from the battery pack. In FIGS. 5b and 6b the plug connection means 42 are spaced apart by a greater distance than those in FIGS. 5a and 6a and so will be received in, and connected with, the outer positioned female connection means 40 on the battery pack 18 which are connected to the power cells in the 36 Volt power supply configuration. It will also be appreciated that the provision of the male plug connection means in the appropriate locations means that this will be matched with the required voltage for the motor of that power tool. It also means that it is not possible for the power tool to be connected to the battery pack to receive the incorrect, and possibly damaging voltage power supply.

It should also be appreciated that other spacings of the connection means plugs can be provided other than those indicated in FIGS. 5a-b and 6a-b.

In addition, or alternatively, the voltage selection can be made via actuation means such as the switch 38 of the power tool which can be operated by a user and which may be provided on the power tool. Typically, the actuation means will have to be operated before the power supply can be provided to the power tool. In another embodiment, the actuation means may be operated to control the switch upon transmission and detection of a signal from the power tool to indicate the voltage which is to be provided to the same for operation. It is preferred that as much of the control means for the operation of the battery pack is provided on the power tool as can be achieved, principally as the power tool lifetime is typically longer than that of the battery pack and therefore it is unattractive to discard the battery pack at the end of it's life with what may be relatively expensive control means provided therewith.

Figure 13:
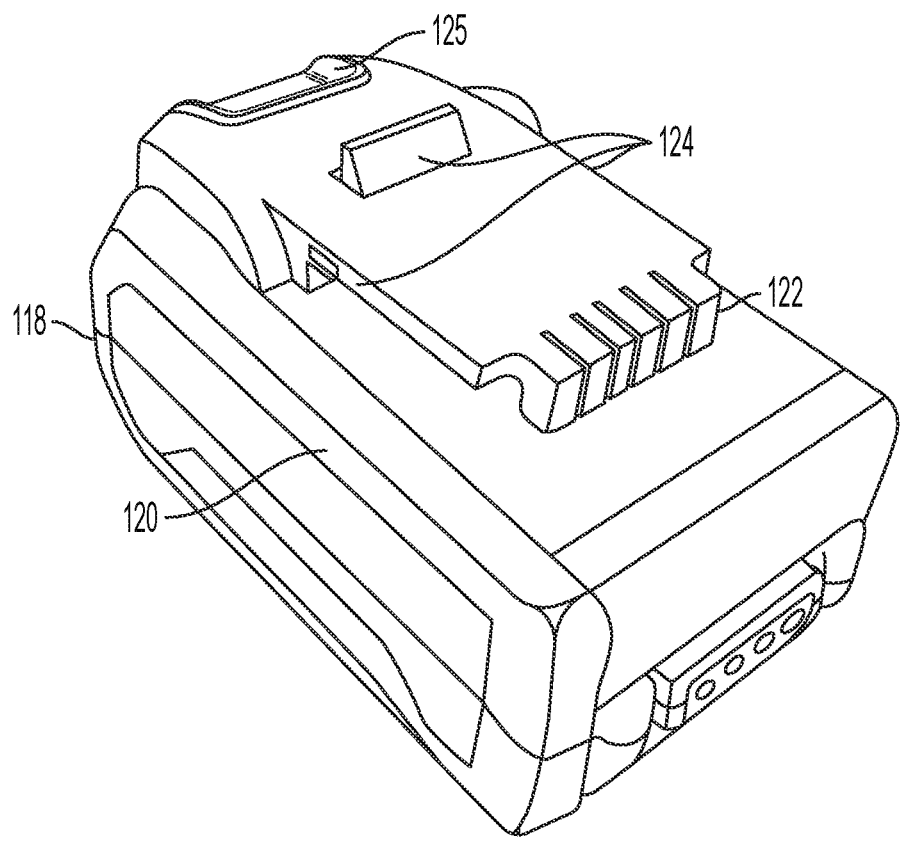
FIG. 13 illustrates a batter pack in accordance with an embodiment of the invention.

FIGS. 2 and 13 illustrate in more detail an example of a battery pack 18 in accordance with an embodiment of the invention and the same comprises a housing 20 within which a series of batteries or cells are located in a fixed and interconnected position. During use of the battery pack 18 no access is required to be made to the power cells and the periodic charging of the cells can be achieved via connection with a battery charger, most typically using the same electrical terminal slots 22 and mechanical connection means 24 which allow connection with the matching connection means of the power tool. Locking means can be provided to allow the battery pack 18 to be located and locked on the power tool. A release button 25 is provided for user actuation to allow the disengagement of the mechanical connection means.

Figure 7:
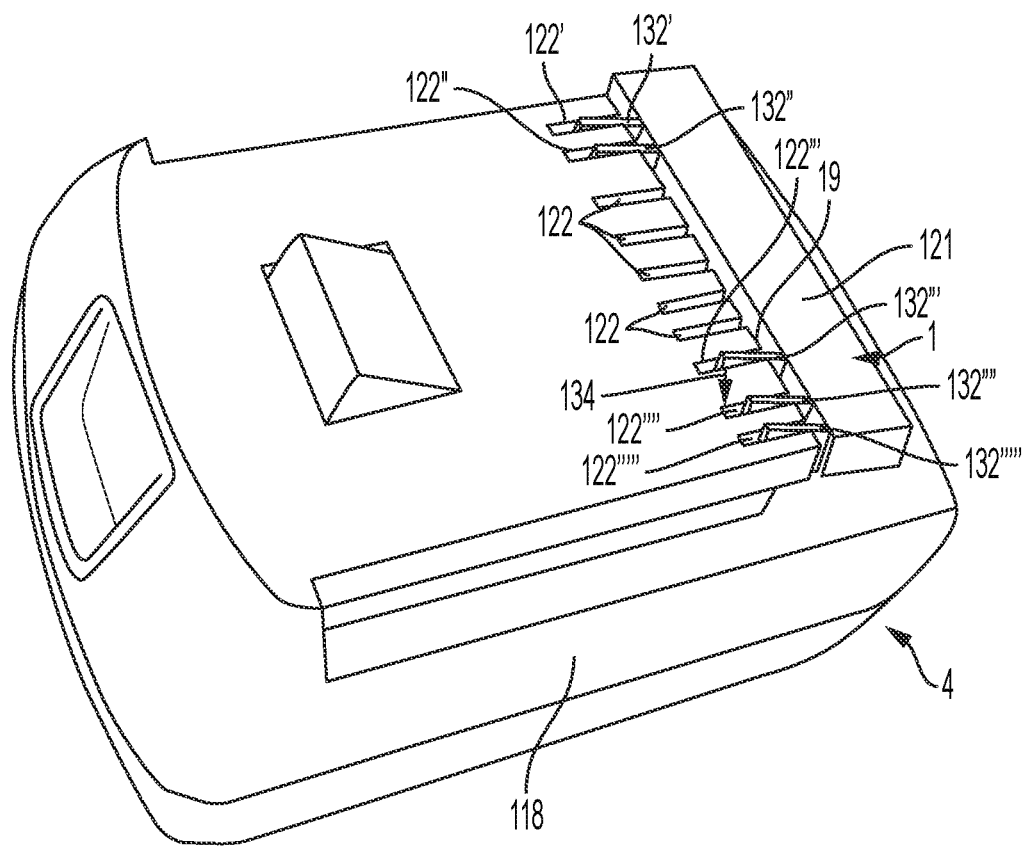
FIG. 7 illustrates schematically the connection interface between the power tool and the battery pack.

In the further embodiment now shown in FIG. 7, there is illustrated a battery pack 118 in accordance with the invention in greater detail. The power taken from the battery pack is provided when the power tool is connected to the battery pack and the particular voltage which is utilised by the power tool is dependent upon the electrical connection means provided within the power tool. The electrical connection at the interface 19 between the power tool 1 (illustrated by the box 1) and the battery pack 118 can be achieved such that the control means for the selection of the voltage provided by the battery pack is provided on the power tool which has a longer life, typically, than the battery pack.

In the embodiment shown in FIG. 7, the power tool 1 is provided with terminal plug set 132 which comprise plugs 132', 132" connected to 0 Volts sockets 122', 122" respectively, plug 132'" connected to Temperature sensing terminal 122'", and plugs 132"" and 132""' connected in 18 Volt terminal sockets 122"" and 122""' respectively. The plugs 132 will most typically, in practice be rotated as indicated by arrow 134 to lie parallel with the sockets 122 when the tool 1 and battery pack 118 interface 19 is fully engaged.

Figure 8:
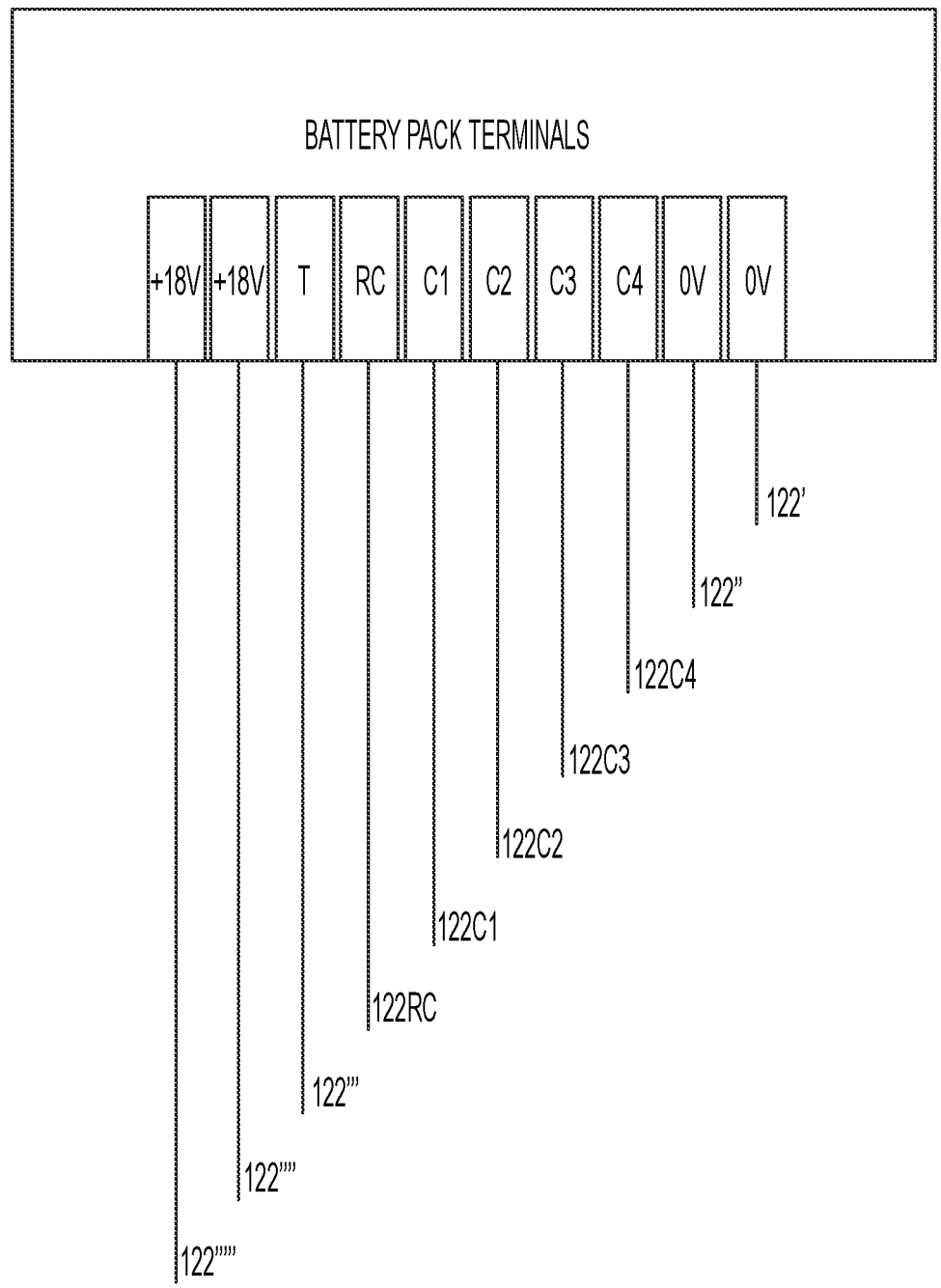
FIG. 8 illustrates the connection terminals for a battery pack in accordance with a further embodiment of the invention.

FIG. 8 illustrates the terminals, typically in the form of sockets 122, of the battery pack 118 in more detail. In this case the socket 122' is the ground connection (0 Volts) for the power cell group 128 and terminal 122" is the ground connection for the power cell group 130. The terminal 122'" is the temperature sensing terminal which signals the temperature from the inside of the battery pack to the power tool during connection for safety purposes. The terminal 122"" is the +18 Volt terminal connection for the power cell group 128 and the terminal 122""' is the +18 Volt terminal connection for the power cell group 130 in the battery pack.

FIGS. 9a and b illustrate the interface 19 between the power tool 1 and the battery pack 118 and illustrate the terminals 122'-122""' of the battery pack which are connected to the power tool 1.

FIG. 9a illustrates the embodiment in which a power tool 1 which requires a 36 Volt power supply for operation is connected to the battery pack and FIG. 9b illustrates the embodiment in which a power tool which requires 18 Volts power supply to operate is connected to the same battery pack 118 as in FIG. 9a. The same battery pack terminal sockets 122'-122""' are connected to the power tool in both embodiments via terminal plugs 132'-132""'. However, in order for the required voltage level to be provided for operation of the particular power tool, each power tool includes therein electrical connection means which are connected to the terminals plugs 132'-132""' and hence terminals 122'-122""' of the battery pack 118. In FIG. 9a the electrical connection means are provided in a first configuration 140 and in FIG. 9b the electrical connection means are provided in a second configuration 142. The electrical connection means are illustrated by the lines which join the power supplied from the terminals 132', 132" and 132'", 132""'. In FIG. 9a the configuration 140 of the electrical connection means effectively results in the power supplied onwardly to the power tool from the power cells in the battery pack is provided in series to therefore provide a higher voltage power level, in this case 36 Volts. In the configuration 142 of FIG. 9b the power supplied onwardly to the power tool from the power cells in the battery pack is provided in parallel which results in the lower voltage level, in this case 18 Volts. It should be noted that this configuration change is implemented within the power tool and therefore the interface 19 and battery pack 118, and mechanical connection means remain in the same format for both power tool versions and for both Voltage level requirements.

Figure 10A:
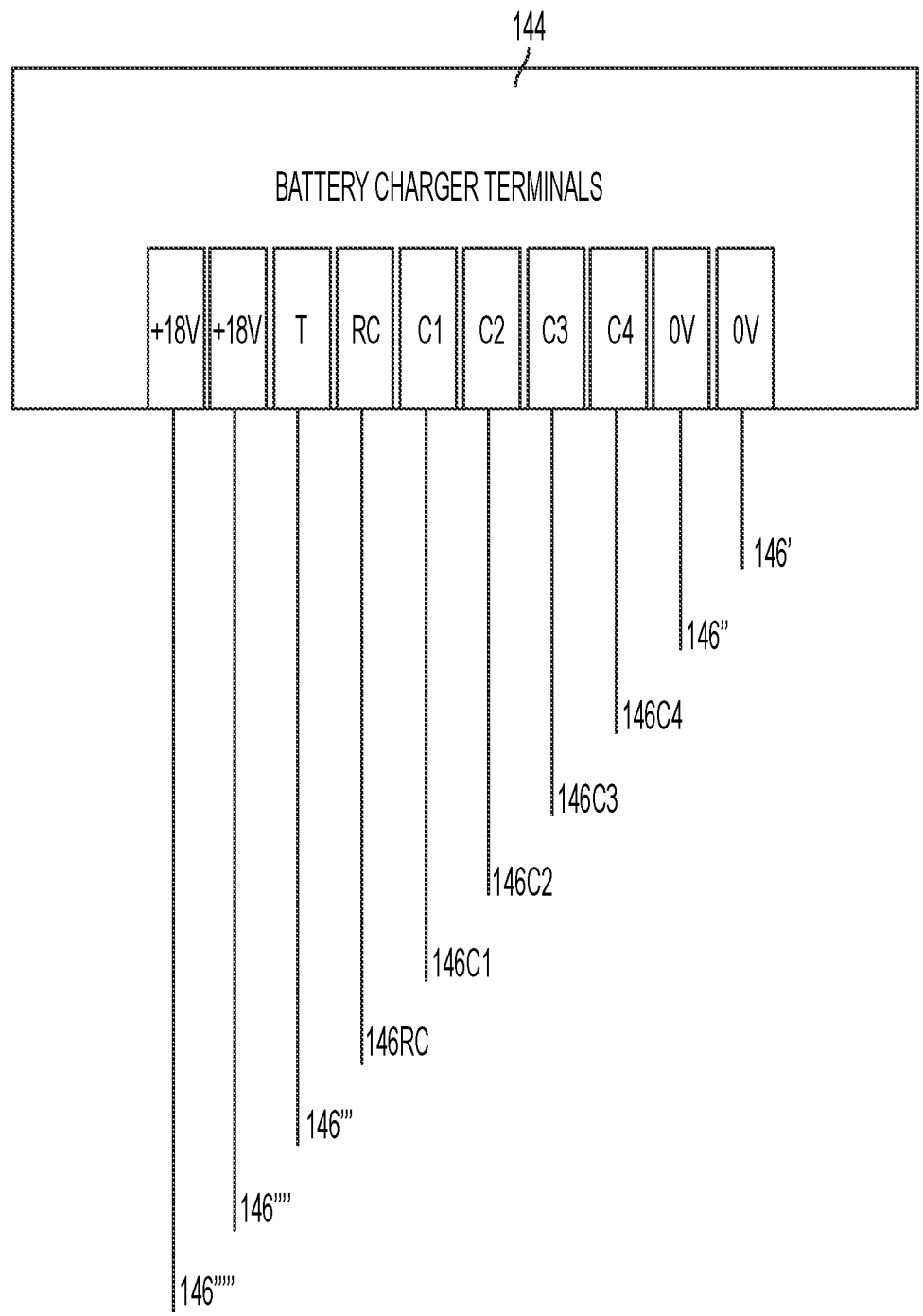
FIG. 10a illustrates a dual voltage battery pack charger connection and terminal functions in accordance with the embodiment of FIGS. 7-9b.

FIG. 10a illustrates a battery charger 144 terminal set 146. The terminals 146c1-146c4 are connected when the battery pack is connected to the battery charger and can be used, as will be described subsequently, to measure the voltage between the individual cells of group 128 or group 130 of the power cells in the battery pack. The particular group selected depends on the signal between the charger terminal 146RC and battery pack terminal 122RC and on which basis a decision is made as to in which group 128 or 130 the voltages between the individual cells are measured.

As with the power tool, the terminal 146' of the charge is connected to the terminal for the ground connection (0 Volts) for the power cell group 128 and terminal 146" is connected to the battery pack terminal for the ground connection for the power cell group 130. The terminal 146'" is connected to the terminal 122'" of the battery pack for temperature sensing which signals the temperature from the inside of the battery pack to the charger during connection for safety purposes. The terminal 146"" is connected via the terminal socket 122"" to the +18 Volt terminal connection for the power cell group 128 and the terminal 146""' is connected via the terminal socket 122""' to the +18 Volt terminal connection for the power cell group 130 in the battery pack.

Figure 10B:
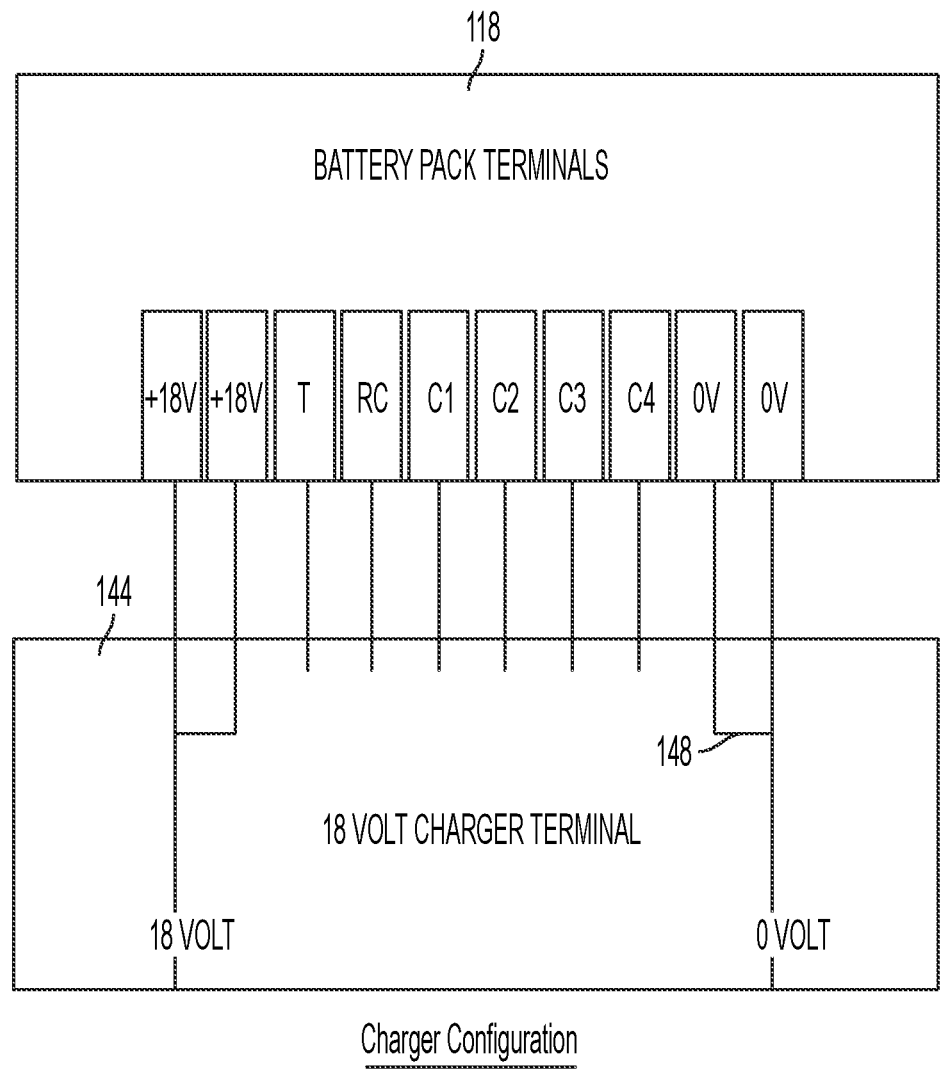
FIG. 10b illustrates the battery pack and charger interface connection and terminal functions in accordance with the embodiment of FIGS. 7-9b.

FIG. 10b illustrates the battery pack 118 connected to the battery charger 144 and illustrates the manner in which the respective terminals are connected in electrical connection means in a battery charging configuration 148 to allow charging of the battery pack 118 to be achieved safely and efficiently.

During the charging operation, there is a need for the cells 26 in the battery pack to be monitored but conventionally in order to monitor each cell would require eight terminals to be provided which is more costly and can be difficult to accommodate due to size constraints. In accordance with one embodiment of the invention the number of terminals can be reduced to 4 (C1-C4) by the provision of switching in which the charger 144 intermittently measures and monitors the power cells in group 128 or group 130 at any given time rather than the power cells in both groups. This is indicated with reference to FIGS. 11a and b. Thus, in accordance with the invention, when the Relay Circuit signal is low (RC off) via terminals 122RC and 146RC, C1 (122C1, 146C1) is indicative that the signals are coming from the group 130 of power cells and when the RC is high (RC on), C1 is indicative that the power cell signals are coming from group 128 of power cells. This means that only a combination of RC and C1 need to be monitored during charging in order to determine whether it is the power cells from Group 128 or Group 130 which are required to be monitored at an instant of time. It should be noted that the relay circuits could be replaced by solid state switching.

Figure 11A:
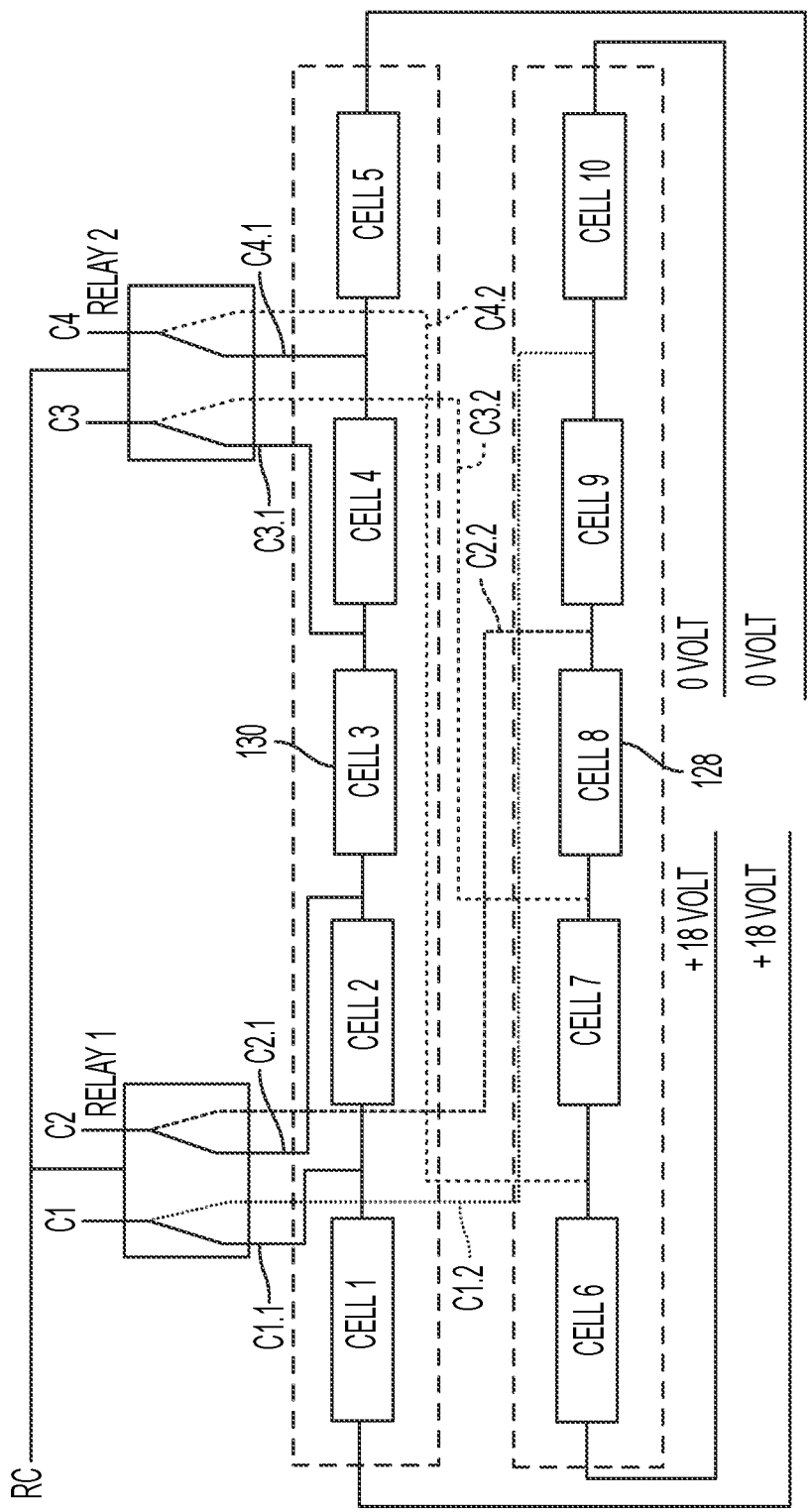
FIGS. 11a and b illustrate an embodiment for monitoring the cells during charging.
Figure 12:
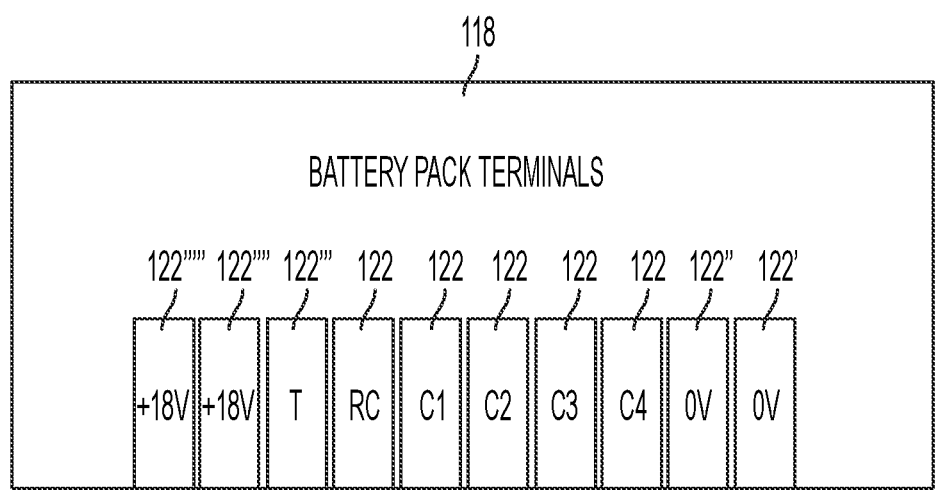
FIG. 12 illustrates the battery pack terminal functions with no power tool or battery charger connected thereto.

Due to the wiring order shown in FIG. 11a, the power cells c1, c2, c3 and c4 signals receive different voltages depending on the connected group 128 or 130 which is selected dependent upon the RC signal.

In terms of the connections between the respective cells in the groups, the connections c1.1, c2.1, c3.1 and c4.1 are connected in the opposite direction to the connections c1.2, 2.2, 3.2 and 4.2 in order to allow measurement of the voltage of the cells but also are indicative of which cell is measured in which group. If the current loop of the RC terminal can be detected but there is no current flow, then a fault condition is indicated.

This, therefore, means that only sufficient terminals, four, for the power cells in one of the groups need to be provided at the interface between the charger 144 and the battery pack 118 as only the power cells in one group are monitored at any given time.

FIG. 11 illustrates the battery pack 118 with neither a power tool or charger apparatus connected thereto and in this embodiment the two groups of power cells 128, 130 within the battery pack are not connected and so the pack is configured as a 2 times 1P5S pack which has the advantage that the individual battery groups are not connected such that the battery pack will not exceed the 100 Wh limit for safe transit and so can be safely transported prior to use as part of a retail pack without safety concerns or requiring adaptation for transit during its lifetime.

Thus, in accordance with the invention the same battery pack 18,118 can be used with different power tools which require different operating voltages. For example, if the battery pack is configured to provide 20 Volts then when connected to a power tool which is provided with electrical connection means therein to provide the required supply of 20 Volts to operate the motor of the same, the power tool will take 20v power only from the battery pack and the power tool will be operable for a period of time.

However, in accordance with the invention, when the battery pack is connected to a power tool which requires a 40 Volt supply to operate the electrical connection means in the power tool are configured such that the required 40 Volts is supplied to the power tool motor from the battery pack by combining the 2×20v supplies of the battery pack into 40 Volts. The power tool running at 40 Volts can then deliver very high performance, suitable for heavy duty tasks.

Thus, unlike prior art, 'multi volt' battery systems, it is the internal wiring of the power tool that determines the voltage which is provided to the motor of that power tool, and the rated power output of the pack does not change. This is in contrast to the conventional systems where the battery pack itself and the power cells therein have to be reconfigured typically by mechanical adaptation assemblies.

The invention claimed is:
1. A battery pack selectably connectable to a power tool that is one of a high voltage power tool and a low voltage power tool each having a plurality of tool terminals, the battery pack comprising:
  a plurality of power cell groups, including a first power cell group and a second power cell group, each cell group having a plurality of power cells connected in series;
  a housing configured to locate the plurality of power cell groups inside the housing, the housing including
    a step portion formed by a first upper portion, a second upper portion located higher than the first upper portion, and a riser portion between the first upper portion and the second upper portion,
    a pair of mechanical connection portions each extending in a front-rear direction and apart from each other in a left-right direction for connection with the power tool, and
    a plurality of slots formed at an interface with the power tool, at least a part of the plurality of slots being formed in the riser portion; and
  a plurality of battery terminals including:
    a first battery positive terminal connected to a positive electrode of the first power cell group, and disposed in a first slot of the plurality of slots;
    a second battery positive terminal connected to a positive electrode of the second power cell group, and disposed in a second slot of the plurality of slots;
    a first battery negative terminal connected to a negative electrode of the first power cell group, and disposed in a third slot of the plurality of slots; and
    a second battery negative terminal connected to a negative electrode of the second power cell group, and disposed in a fourth slot of the plurality of slots,
  wherein the first battery positive terminal, the second battery positive terminal, the first battery negative terminal, and the second battery negative terminal are respectively disposed inside the first to fourth slots that are different from each other and are formed in the riser portion, and are arranged in a row in the left-right direction,
  wherein, in state that the battery pack is not connected to the power tool, the first battery positive terminal, the second battery positive terminal, the first battery negative terminal, and the second battery negative terminal are not connected to each other, and the plurality of power cell groups are not electrically connected to each other, and
  wherein, both in state that the battery pack is connected to the high voltage power tool and in state that the battery pack is connected to the low voltage power tool, all the first battery positive terminal, the second battery positive terminal, the first battery negative terminal, and the second battery negative terminal are directly connected to corresponding terminals of the plurality of tool terminals, respectively.

2. The battery pack according to claim 1, wherein the battery pack further comprises a battery signal terminal disposed in a fifth slot of the plurality of slots.

3. The battery pack according to claim 2, wherein the first battery positive terminal, the second battery positive terminal, the first battery negative terminal, the second battery negative terminal, and the battery signal terminal are respectively disposed inside the first to fifth slots different from each other, and are arranged in the row in the left-right direction.

4. The battery pack according to claim 2,
wherein the first and second battery positive terminals are located adjacent to each other to form a pair of battery positive terminals,
wherein the first and second battery negative terminals are located adjacent to each other to form a pair of battery negative terminals, and
wherein the battery signal terminal is located between the pair of battery positive terminals and the pair of battery negative terminals in the left-right direction.

5. The battery pack according to claim 2, wherein the battery signal terminal is a battery temperature sensing terminal signaling a temperature inside the battery pack.

6. A power tool assembly comprising the battery pack according to claim 1, and a high voltage power tool connectable to the battery pack,
the high voltage power tool comprising:
a plurality of tool terminals including a first tool negative terminal connectable to the first battery negative terminal, a second tool negative terminal connectable to the second battery negative terminal, a first tool positive terminal connectable to the first battery positive terminal, and a second tool positive terminal connectable to the second battery positive terminal; and
a high voltage electrical connection portion connecting the second tool negative terminal and the first tool positive terminal,
wherein the first and second power cell groups are connected in series via the high voltage electrical connection portion when the battery pack is connected to the high voltage power tool.

7. The power tool assembly according to claim 6,
wherein the battery pack further comprises a battery signal terminal disposed inside a fifth slot of the plurality of slots, and
wherein the high voltage power tool further comprises a tool signal terminal connectable to the battery signal terminal.

8. The power tool assembly according to claim 7, wherein the first tool negative terminal, the second tool negative terminal, the first tool positive terminal, the second tool positive terminal, and the tool signal terminal are arranged in the row in the left-right direction.

9. The power tool assembly according to claim 7, wherein the tool signal terminal is located between the first and second tool negative terminals and the first and second tool positive terminals in the left-right direction.

10. A power tool assembly comprising the battery pack according to claim 1, and a low voltage power tool connectable to the battery pack,
the low voltage power tool comprising:
a plurality of tool terminals including a first tool negative terminal connectable to the first battery negative terminal, a second tool negative terminal connectable to the second battery negative terminal, a first tool positive terminal connectable to the first battery positive terminal, and a second tool positive terminal connectable to the second battery positive terminal;
a negative low voltage electrical connection portion connecting the first tool negative terminal and the second tool negative terminal; and
a positive low voltage electrical connection portion connecting the first tool positive terminal and the second tool positive terminal,
wherein the first and second power cell groups are connected in parallel via the negative and positive low voltage electrical connection portions when the battery pack is connected to the low voltage power tool.

11. The power tool assembly according to claim 10,
wherein the battery pack further comprises a battery signal terminal disposed inside a fifth slot of the plurality of slots, and
wherein the low voltage power tool further comprises a tool signal terminal connectable to the battery signal terminal.

12. The power tool assembly according to claim 11, wherein the first tool negative terminal, the second tool negative terminal, the first tool positive terminal, the second tool positive terminal, and the tool signal terminal are arranged in the row in the left-right direction.

13. The power tool assembly according to claim 11, wherein the tool signal terminal is located between the first and second tool negative terminals and the first and second tool positive terminals in the left-right direction.

14. The power tool assembly according to claim 6, wherein the first battery positive terminal and the second battery negative terminal are located between the second battery positive terminal and the first battery negative terminal in the row in the left-right direction.

15. The power tool assembly according to claim 14, wherein the first tool positive terminal and the second tool negative terminal are located between the second tool positive terminal and the first tool negative terminal in another row in the left-right direction.

16. The battery pack according to claim 3, wherein the battery signal terminal is located between the first battery positive terminal and the second battery negative terminal in the row in the left-right direction.

17. The battery pack according to claim 1, wherein the second battery positive terminal is a most high voltage output terminal and the first battery negative terminal is a ground terminal in state that the battery pack is connected to a high voltage power tool.

18. The battery pack according to claim 1,
wherein the battery pack connectable to the high voltage power tool having a high voltage electrical connection portion,
wherein the second battery negative terminal and the first battery positive terminal are connected to the high voltage electrical connection portion, the first and second power cell groups are connected in series via the high voltage electrical connection portion, and
wherein the second battery negative terminal and the first battery positive terminal are located between the first battery negative terminal and the second battery positive terminal in the row in the left-right direction.

19. The battery pack according to claim 18, wherein the second battery positive terminal is a most high voltage output terminal, and the first battery negative terminal is a ground terminal in state that the battery pack is connected to the high voltage power tool.

* * * * *